（12）United States Patent
Yamasaki et al.

(10) Patent No.: US 6,707,787 B2
(45) Date of Patent: Mar. 16, 2004

(54) OPTICAL RECORDING MEDIUM

(75) Inventors: Takeshi Yamasaki, Kanagawa (JP); Tomomi Yukumoto, Chiba (JP); Toshiyuki Kashiwagi, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/941,523

(22) Filed: Aug. 29, 2001

(65) Prior Publication Data

US 2002/0075795 A1 Jun. 20, 2002

(30) Foreign Application Priority Data

Aug. 30, 2000 (JP) .................................... P2000-261765

(51) Int. Cl.⁷ .......................... G11B 3/70; G11B 5/84; G11B 7/26
(52) U.S. Cl. ..................................................... 369/283
(58) Field of Search ................................ 369/283, 286, 369/291, 272

(56) References Cited

U.S. PATENT DOCUMENTS

| | | | | | |
|---|---|---|---|---|---|
| 4,879,710 A | * | 11/1989 | Iijima | ........................ | 369/291 |
| 4,972,402 A | * | 11/1990 | Miura et al. | ............. | 369/275.1 |
| 6,033,752 A | * | 3/2000 | Suzuki et al. | .............. | 428/64.1 |
| 6,269,072 B1 | * | 7/2001 | Ohgo | ........................ | 369/286 |
| 6,309,727 B1 | * | 10/2001 | Mueller et al. | ............. | 428/64.1 |
| 6,507,559 B1 | * | 1/2003 | Iwaki | ....................... | 369/275.5 |
| 2003/0043730 A1 | * | 3/2003 | Uchiyama et al. | ........ | 369/275.5 |

FOREIGN PATENT DOCUMENTS

JP     6-52587 A  *  2/1994

* cited by examiner

*Primary Examiner*—Julie Anne Watko
(74) *Attorney, Agent, or Firm*—Sonnenschein, Nath & Rosenthal LLP

(57) ABSTRACT

An optical recording medium capable of improving uniformity of thickness of a protective film and suppressing warping. The medium is configured to include a substrate, an optical recording film formed on the substrate, and a light transmitting protective film formed above the optical recording layer, wherein the protective film includes a polymer sheet produced by melt casting and an adhesive layer for bonding the polymer sheet to the optical recording layer. As the polymer sheet, a polycarbonate sheet, a cyclic polyolefin sheet, etc. can be used. As the adhesive layer, an ultraviolet curing resin, a heat curing resin, an epoxy resin-based adhesive agent or a pressure-sensitive tackiness agent may be used alone or mixed or stacked.

6 Claims, 14 Drawing Sheets

OPTICAL RECORDING MEDIUM

RELATED APPLICATION DATA

The present application(s) claims priority to Japanese Application(s) No(s). P2000-261765 filed Aug. 30, 2000, which application(s) is/are incorporated herein by reference to the extent permitted by law.

BACKGROUND OF THE INVENTION

1. Field of the Invention

The present invention relates to an optical recording medium having an optical recording layer for optically recording information and a method of producing the same.

2. Description of the Related Art

In recent years, in the field of information recording, research has been underway in various locations on optical information recording systems. Optical information recording systems have a number of advantages such as a capability of non-contact recording and reproduction, a capability of handling different forms of memories such as read only, write-once, and rewritable types. Broad applications from industrial use to consumer use can be envisioned for these as systems enabling realization of low cost, large size files.

A larger capacity of the optical recording media for the above various types of optical information recording systems (hereinafter also referred to as an "optical disk") has been achieved mainly by shortening the wavelength of the laser light serving as the light source used in the optical information recording systems and using lenses having larger numerical apertures to reduce the spot size on the focal plane.

For example, in a CD (compact disk), the laser light wavelength is 780 nm, the numerical aperture (NA) of the lens is 0.45, and a capacity is 650 MB, while in a DVD-ROM (digital versatile disk—read only memory), the laser light wavelength is 650 nm, the NA is 0.6, and the capacity is 4.7 GB.

Furthermore, in the next generation optical disk systems, a larger capacity of 22 GB or more can be achieved by using an optical disk including an optical recording layer over which is formed a thin light transmitting protective film (cover layer) having a thickness of, for example, about 100 μm and making the laser light wavelength 450 nm or less and the NA 0.78 or more.

FIG. 1 is a schematic sectional view of the structure of an optical disk for the above next generation optical disk systems.

For example, an optical recording layer 11 comprised of an aluminum or other metal film or a phase change type thin film made of inorganic material or other and having irregularities of lands L and grooves G is formed on a substrate 10 comprised of a polycarbonate and having a thickness of about 1.1 mm.

The optical recording layer 11 is coated by, for example, an ultraviolet curing resin to form a light transmitting protective film 14.

The above optical disk is a type of optical disk where laser light is focused on the optical recording layer 11 through the protective film 14 and the reflected light is read. By making it above type, a higher numerical aperture can be achieved.

The method of producing the above conventional optical disk having the above optical recording layer will be explained next.

First, a pattern of irregularities for the optical recording layer is formed by for example injection-molding on a substrate comprised for example of a polycarbonate and having a thickness of 1.1 mm, then aluminum etc. is deposited thereon by for example sputtering so as to form a reflection film having a pattern corresponding to the above pattern of irregularities, that is, the optical recording layer 11.

Next, a liquid-state ultraviolet curing resin is supplied by spinning coating on the optical recording layer 11 from a dispenser while making the substrate 10 spin so as to form an ultraviolet curing resin film.

Next, ultraviolet light is irradiated on the ultraviolet curing resin film to cause the same to cure and form a protective film. By this, an optical disk having the structure shown in FIG. 1 can be obtained.

However, in the above process of forming an ultraviolet curing resin film, there was the problem that the ultraviolet curing resin film for forming a protective film could not be formed uniformly on the substrate due to the high viscosity of the ultraviolet curing resin.

FIG. 2 is a schematic sectional view of the state in the step of forming the above ultraviolet curing resin film.

A not shown optical recording layer is formed on the substrate 10. When coating an uncured film 14a of an ultraviolet curing resin thereon by spin coating, since the viscosity of the ultraviolet curing resin is high, the thickness of the uncured film 14a ends up becoming vastly different between near the center of the substrate (region expressed by x in the figure) and near the periphery (region expressed by y in the figure). It was thus difficult to obtain a uniform thickness.

Also, as explained above, at the time of curing the ultraviolet curing resin film by irradiating ultraviolet light, the cure shrinkage of the resin is large, so there was the problem that the optical disk produced ended up warping by a large degree. Also, a change in temperature or humidity also became a cause of warping because of the difference in the coefficient of expansion and water absorption of the protective film.

The amount of spherical aberration caused when the thickness of the above protective film deviates from its set value is proportional to $NA^4/\lambda$ for a laser light wavelength $\lambda$ and a numerical aperture NA, so when shortening the wavelength of the laser light and raising the numerical aperture to increase the capacity as explained above, the characteristics required in the optical disk for keeping down spherical aberration become stricter and the uniformity-of the thickness of the protective film has to be improved.

Also, the amount of coma aberration occurring when warping (tangential or radial skew) of a disk occurs is proportional to $NA^3/\lambda$, so in the same way as above, when shortening the wavelength of the laser light and increasing the numerical aperture to increase the capacity, the characteristics required in the optical disk for keeping down coma aberration become stricter and warping of the disk has to be suppressed.

SUMMARY OF THE INVENTION

An object of the present invention is to provide an optical recording medium capable of improving the uniformity of thickness of a protective film and suppressing warping and a method of producing the same.

To achieve the above object, an optical recording medium of the present invention comprises: a substrate; an optical recording layer formed on the substrate; and a light transmitting protective film formed at an upper layer of the optical recording layer; wherein the protective film includes a polymer sheet produced by melt casting and an adhesive layer for bonding the polymer sheet to the optical recording layer.

In the optical recording medium of the present invention, preferably, a surface formed in contact with the cast when the polymer sheet is produced by melt casting is arranged to be at a far side from the optical recording layer.

In the optical recording medium of the present invention, preferably, a residual solvent in the polymer sheet is not more than 0.3 wt %.

In the optical recording medium of the present invention, preferably, a birefringence in the in-plane direction of the polymer sheet is not more than 15 nm.

In the optical recording medium of the present invention, preferably, a difference of an average value of a refractive index in an in-plane direction of the polymer sheet and a refractive index in a direction perpendicular to the in-plane direction is not more than 0.0015.

In the optical recording medium of the present invention, preferably, the adhesive layer comprises a stack of a ultraviolet curing resin-based adhesive agent layer and a pressure-sensitive tackiness agent layer.

In the optical recording medium of the present invention, preferably, the polymer sheet comprises a polycarbonate.

The above optical recording medium of the present invention includes as a light transmitting protective film above the optical recording layer a polymer sheet produced by melt casting and an adhesive layer for bonding the polymer sheet to the optical recording layer.

In this configuration, since it becomes possible to make the adhesive layer thinner than that of conventional optical disk, warping accompanying cure shrinkage of the adhesive layer can be reduced. Furthermore, warping at the time when the temperature or humidity changes can be suppressed.

Also, a polymer sheet produced by melt casting can be produced while controlling unevenness of the thickness to be about ±1 $\mu$m of an average value, for example, when the thickness is about 100 $\mu$m, so the uniformity of the thickness of the protective film including the polymer sheet and the adhesive layer can be improved.

The optical recording medium of the present invention can improve the uniformity of the thickness of the protective film and suppress warping as explained above.

Also, to attain the above object, according to the present invention, a method of producing an optical recording medium comprises the steps of: forming an optical recording layer on a substrate and forming a light transmitting protective film at an upper layer of the optical recording layer; wherein the step of forming the protective layer includes a step of bonding a polymer sheet produced by melt casting to the optical recording layer by an adhesive layer.

The above method of producing an optical recording medium of the present invention, preferably, the polymer sheet is arranged so that a surface formed in contact with a cast when produced by melt casting becomes at a side far from the optical recording layer.

The above method of producing an optical recording medium of the present invention, preferably, as the polymer sheet, one having a residual solvent in the polymer sheet of not more than 0.3 wt % is used.

The above method of producing an optical recording medium of the present invention, preferably, further comprises, before the step of bonding the polymer sheet, a step of annealing the polymer sheet in advance.

The above method of producing an optical recording medium of the present invention, preferably, a polymer sheet having a birefringence in the in-plane direction of not more than 15 nm is used as the polymer sheet.

The above method-of producing an optical recording medium of the present invention, preferably, a polymer sheet having a difference of an average value of a refractive index in the in-plane direction and a refractive index in a direction perpendicular to the in-plane direction of not more than 0.0015 is used as the polymer sheet.

The above method of producing an optical recording medium of the present invention, preferably, a adhesive layer including a stack of a ultraviolet curing resin-based adhesive agent layer and a pressure-sensitive tackiness agent layer is used as the adhesive layer.

The above method of producing an optical recording medium of the present invention, preferably, a polymer sheet comprising a polycarbonate is used as the polymer sheet.

The above method of producing an optical recording medium of the present invention forms an optical recording layer on a substrate, then forms a light transmitting protective film above the optical recording layer. Here, the step of forming the protective film includes a step of bonding the polymer sheet produced by the melt casting to the above optical recording layer by an adhesive layer.

According to the method of producing an optical recording medium of the above present invention, the adhesive layer in the protective film can be made thinner than that of conventional optical disk, thus warping accompanying cure shrinkage of the adhesive layer or warping when the temperature and humidity change can be suppressed.

Also, a polymer sheet produced by melt casting can be produced controlling unevenness of the thickness to the about ±1 $\mu$m of the average value in the case of a thickness of for example about 100 $\mu$m, so the uniformity of the thickness of the protective film can be improved.

The method of producing an optical recording medium of the present invention improves the uniformity of the thickness of the protective film as explained above, so warping can be suppressed.

BRIEF DESCRIPTION OF THE DRAWINGS

These and other objects and features of the present invention will become clearer from the following description with reference to the attached drawings, wherein:

FIGS. 7A and 7B are perspective views for explaining a production process of an optical recording medium according to the first embodiment, wherein FIG. 7A shows the state up to a step of supply of an adhesive agent and FIG. 7B shows the state up to a step of stacking of a polymer sheet;

FIGS. 8A and 8B are perspective views of steps continuing from FIGS. 7A and 7B, wherein FIG. 8A shows the state up to a step of spreading an adhesive agent between a polymer sheet and an optical recording layer, and FIG. 8B shows the state up to a step of curing of a resin;

FIGS. 9A and 9B are perspective views for explaining a production process of an optical recording medium according to the second embodiment, wherein FIG. 9A shows a state up to a step of producing a stacked tackiness agent sheet, and FIG. 9B shows a state up to a step of punching out the stacked tackiness agent sheet;

FIGS. 10A and 10B are perspective views of steps continuing from FIGS. 9A and 9B, wherein FIG. 10A shows a state up to a step of peeling off a PET liner on one surface, and FIG. 10B shows a state up to a step of stacking an optical recording layer of a substrate and a tackiness agent sheet;

FIGS. 11A and 11B are perspective views of steps continuing from FIGS. 10A and 10B, wherein FIG. 11A shows a state up to a step of bonding the optical recording layer of the substrate and the tackiness agent sheet, and FIG. 11B shows a state up to a step of peeling off a PET liner on the other surface;

FIGS. 12A and 12B are perspective views of steps continuing from FIGS. 11A and 11B, wherein FIG. 12A shows a state up to a step of stacking the polymer sheet and the tackiness agent sheet, and FIG. 12B shows a state up to a step of bonding the polymer sheet and the tackiness agent sheet;

FIGS. 14A and 14B are graphs wherein a value of a radial skew (degree) is plotted with respect to a radius (mm) in an optical disk sample according to Example 1, wherein FIG. 14A shows results when the amount of residual solvent in the polymer sheet is 0.16 wt % and FIG. 14B shows the results when it is 0.27 wt %;

FIGS. 15A and 15B are graphs wherein a value of a radial skew (degree) is plotted with respect to a radius (mm) in an optical disk sample according to Example 1, wherein FIG. 15A shows results when the amount of residual solvent in the polymer sheet is 0.49 wt % and FIG. 15B shows results when it is 0.59 wt %;

DESCRIPTION OF THE PREFERRED EMBODIMENTS

Below, embodiments of the present invention will be explained in detail with reference to the drawings.

First Embodiment

Figure 1:
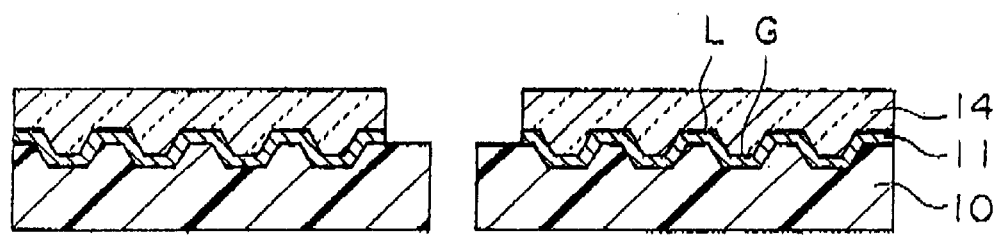
FIG. 1 is a schematic sectional view of an optical recording medium according to the conventional example.
Figure 2:
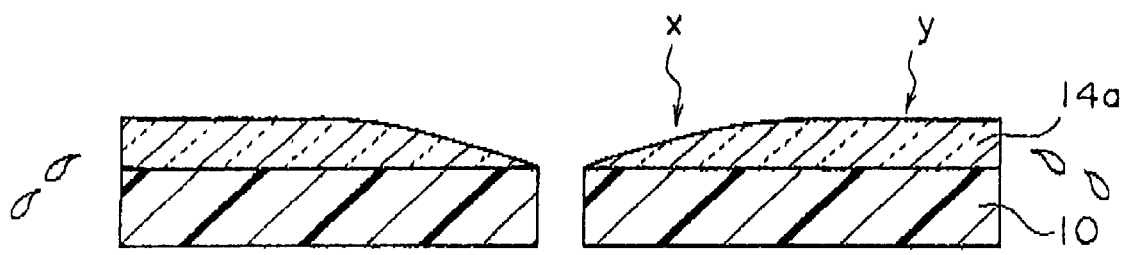
FIG. 2 is a schematic sectional view for explaining problems according to the conventional example.
Figure 3:
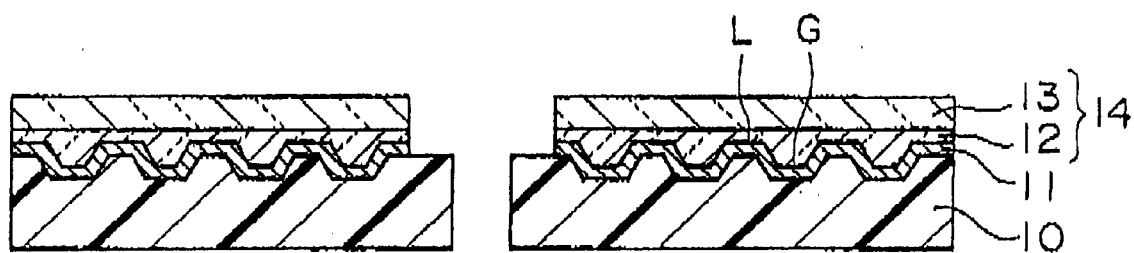
FIG. 3 is a schematic sectional view of an optical recording medium according to the first embodiment.

FIG. 3 is a schematic sectional view of a multilayer optical recording medium (hereinafter also referred to as an "optical disk") according to the present embodiment.

A pattern of irregularities for the optical recording layer is formed by, for example, injection-molding on a substrate 10 comprised of, for example, a polycarbonate and having a thickness of at least 0.3 mm, for example, about 1.1 mm, and at the upper layer thereof is formed an optical recording layer 11 comprised of an aluminum or other reflection film or a phase change type thin film made of inorganic material or other and having an irregularities of lands L and grooves G.

Over the optical recording layer 11, a polymer sheet 13 produced by melt casting is stacked and bonded via an adhesive layer 12. A light transmitting protective film 14 is configured by the adhesive layer 12 and the polymer sheet 13 and having a thickness of about 100 $\mu$m by the two layers together.

The above optical recording layer 11 may also be formed on the two sides of the substrate 10. In that case, the protective film 14 is formed covering both surfaces.

An optical disk of the present embodiment is a type of optical disk where laser light is focused on the optical recording layer 11 through the light transmitting protective film 14 and the reflected light is read. By making it above type, a higher numerical aperture can be achieved.

The optical recording layer 11 is, for example, comprised of a reflection film made by aluminum or other metal, or inorganic or organic thin film of a phase change type or other type.

The polymer sheet 13 is preferably optically transparent, has a low birefringence, and has a uniform thickness. As a material satisfying these conditions, for example, a polycarbonate, cyclic polyolefin, chain polyolefin, polymethyl methacrylate (PMMA), and modified acryl may be used.

The adhesive layer 12 for bonding the polymer sheet 13 to the optical recording layer 11 may be selected for use for example from an ultraviolet curing resin-based adhesive agent, a heat curing resin-based adhesive agent, an epoxy resin-based adhesive agent, and a pressure-sensitive tackiness agent, etc. Also, two or more types from those may be mixed or stacked for use.

The bond strength by the adhesive layer 12 is made one of an extent of resisting temperature changes, humidity changes, external impact, etc. so as to prevent peeling. The bond strength depends on a material and thickness of the optical recording layer 11 and the materials and thicknesses of the substrate 10 and the polymer sheet 13 etc.

It is necessary to adjust the polymer in the adhesive layer 12, decomposed polymer products, unreacted monomer, reaction initiator, equilibrium absorption, etc. to prevent corrosion and other reactions changing the recording and reproducing characteristics of the optical recording layer 11, dispersion, etc.

In the optical disk of the present embodiment, the polymer sheet 13 composing the protective film is a sheet produced by melt casting using the above materials.

Figure 4:
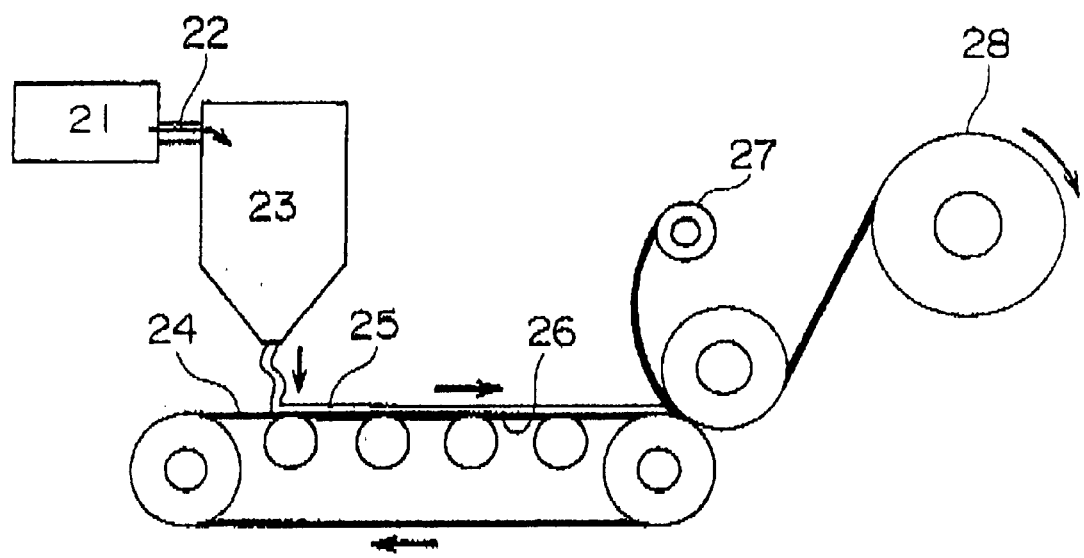
FIG. 4 is a schematic view for explaining a method of producing a polymer sheet by melt casting.

The method of producing the polymer sheet by melt casting will be explained with reference to FIG. 4.

A polymer material is dissolved in a solvent in a solution tank 21 and heated to a high temperature. The obtained polymer solution 22 is transferred to a coating tank 23. The above polymer solution 22 is coated on a flat substrate or a belt 24 from a dispenser at the bottom of the coating tank 23 so as to obtain a polymer solution coating film 25.

While leaving still the above polymer solution coating film 25 or conveying the same on a conveyer belt 26, it is dried, that is, the solvent is evaporated, then the obtained sheet is rolled together with a protective film 27 to obtain a polymer sheet roll 28.

Figure 5:
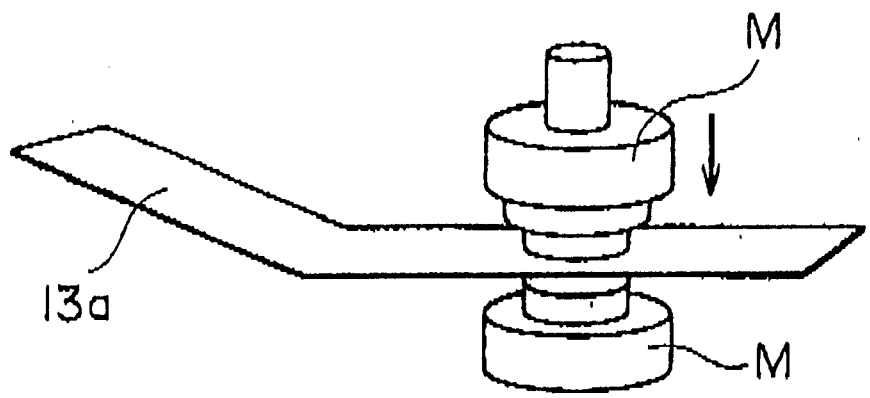
FIG. 5 is a perspective view for explaining a punching step of a polymer sheet.

The polymer sheet 13a produced in the above way may be used, for example, as shown in FIG. 5, by punching it out to an optical disk size by a punching press M.

For example, when producing a polymer sheet having a thickness of 100 μm, a polymer solution diluted five-fold with a solvent is prepared and coated to a thickness of 500 μm. First, it is leveled at the time of coating to assist uniformity of the thickness. The unevenness of the thickness at this time is for example about ±5 μm. When the thickness becomes 100 μm by drying of the coated film, however, the unevenness of the thickness becomes reduced to for example ±1 μm with respect to the average value, so a sheet having a small unevenness of thickness can be obtained.

By using a polymer sheet controlled in unevenness of thickness to ±1 μm as in the above, it is possible to use as the protective film 14 a film controlled in thickness to a range of ±2 μm of the average value of the thickness of the protective film 14. Further, it is possible to use a film controlled in thickness to a range of ±3 μm with respect to a set value (for example, 100 μm) of the thickness of the protective film 14.

In this way, the uniformity of the thickness of the protective film including the polymer sheet and the adhesive layer can be improved.

Also, compared the general method of producing a polymer sheet, that is, extrusion, by using melt casting, the force pulling the sheet in one direction can be kept small at the time of producing the polymer sheet, the orientation of molecules in the sheet is suppressed, and the amount of birefringence in the in-plane direction of the optical disk can be made not more than 15 nm, that is the amount of birefringence amount possessed by the polymer sheet as an initial value plus an increase of the birefringence due to the photoelasticity effect.

When the amount of birefringence is large, this becomes a factor behind a decrease or fluctuation of laser return light reflected at the optical recording layer of the optical disk, but since the amount of birefringence can be reduced, the decrease or fluctuation of laser return light can be suppressed.

Also, in the polymer sheet comprised of a polycarbonate, the difference of an average value of a refractive index in the in-plane direction and a refractive index in a direction perpendicular to the in-plane direction can be made not more than 0.0015.

Furthermore, in the configuration of the optical disk according to the above present embodiment, since the adhesive layer 12 can be made thinner than in the past, warping accompanying cure shrinkage of the adhesive layer can be reduced. Furthermore, warping when the temperature or humidity changes can be suppressed.

As the material of the adhesive layer, it is preferable to use one having a volume shrinkage of not more than 15%. Also, the higher the hardness, the larger the warping, so the Young's modules is preferably low. Since a pressure-sensitive tackiness agent has a low Young's modules, it has the characteristic of making warping difficult even when the adhesive layer is made thick.

Furthermore, to suppress warping of a disk, it is important that the coefficient of thermal expansion at the time of a temperature change and the rate of change of volume at the time of absorption of moisture be matched in the materials of the polymer sheet 13 and the substrate 10. For example, by using the same material for the polymer sheet 13 and the substrate 10, warping of the optical disk can be easily suppressed.

When using a sheet comprised of a polycarbonate as the above polymer sheet 13, the solvent used by the melt casting, that is, methylene chloride ($CH_2Cl_2$), remains in some cases. The residual solvent volatilizes even after the sheet is bonded on the optical recording layer of the substrate for configuring the optical disk, so volume shrinkage occurs in the polymer sheet 13 and warping of the optical disk occurs.

Accordingly, the less the residual solvent in the polymer sheet comprised of a polycarbonate, the more preferable, for example, not more than 0.3 wt % is preferable.

The residual solvent in the sheet can be adjusted by the dilution strength and drying conditions in the melt casting, but when the drying time is long, it leads to a decline in productivity such as with a slower coating speed. To secure a speed of the coating to an extent not causing a decline in productivity, even when drying is insufficient and the residual solvent in the sheet becomes more than 0.3 wt %, warping of the optical disk can be suppressed by annealing the sheet for example at a temperature of 50 to 140° C. for 10 seconds or more, preferably at 80 to 130° C. for 5 minutes or more, in advance to sufficiently volatilize the residual solvent in the polymer sheet 13 before bonding the sheet to the optical recording layer of the substrate for configuring the optical disk.

Figure 6:
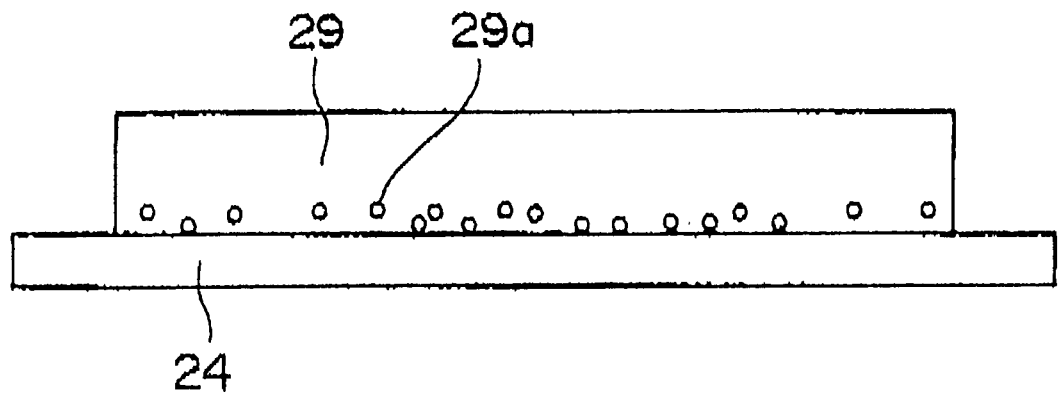
FIG. 6 is a schematic view of a distribution of occurrence of air bubbles, crystals, or other foreign matter in a polymer sheet obtained by melt casting.

Also, when using a sheet comprised of a polycarbonate as the above polymer sheet 13, as shown FIG. 6, which is the schematic sectional view of the polymer sheet in the melting cast step, air bubbles of a size of about 5 μm or less or crystals or other foreign matter 29a are formed in the polymer sheet 29 in some cases. This foreign matter 29a is characterized by occurring more on the belt 24 side than on the surface of the polymer sheet 29 when the sheet is cast.

Accordingly, when bonding the above polymer sheet as a protective film on the optical recording layer, it is preferable that the surface of the polymer sheet which was in contact with the belt 24 become the surface of the optical disk.

The diameter of the laser beam for recording and reproduction spreads from the signal surface, so by arranging the foreign matter 29a far from the signal surface, the effect of the foreign matter on the recording and reproduction of signals can be reduced.

The optical disk of the present embodiment includes as a light transmitting protective film above the optical recording layer a polymer sheet produced by melt casting and an adhesive layer for bonding the polymer sheet to the optical recording layer and therefore can make the adhesive layer thinner than in the past to reduce warping accompanying cure shrinkage of the adhesive layer and can suppress warping when the temperature or humidity changes. Furthermore, the polymer sheet produced by the melt casting can be improved in the uniformity of thickness and can reduce the amount of birefringence, so can improve the uniformity of thickness and can reduce the amount of birefringence of the protective film including the polymer sheet.

The method of producing the optical disk of the above embodiment will be explained with reference to the drawings.

First, a pattern of irregularities for the optical recording layer is formed by, for example, injection-molding on a substrate 10 comprised, for example, of a polycarbonate and having a thickness of at least 0.3 mm, for example, about 1.1 mm. An aluminum or other reflection film, or inorganic thin film of a phase change type or other type is deposited on this by sputtering so as to form an optical recording layer 11.

Figure 7A:
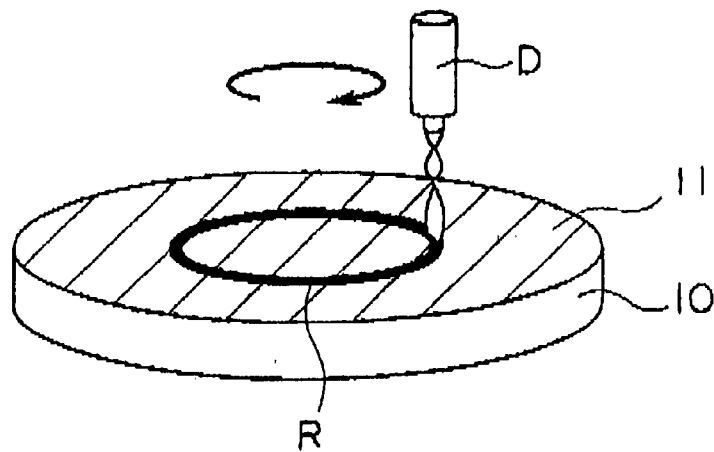

Next, as shown in FIG. 7A, a liquid-state ultraviolet curing resin, heat curing resin, epoxy resin, or other adhesive agent R is supplied on the optical recording layer 11 by a dispenser D while spinning the substrate 10.

Figure 7B:
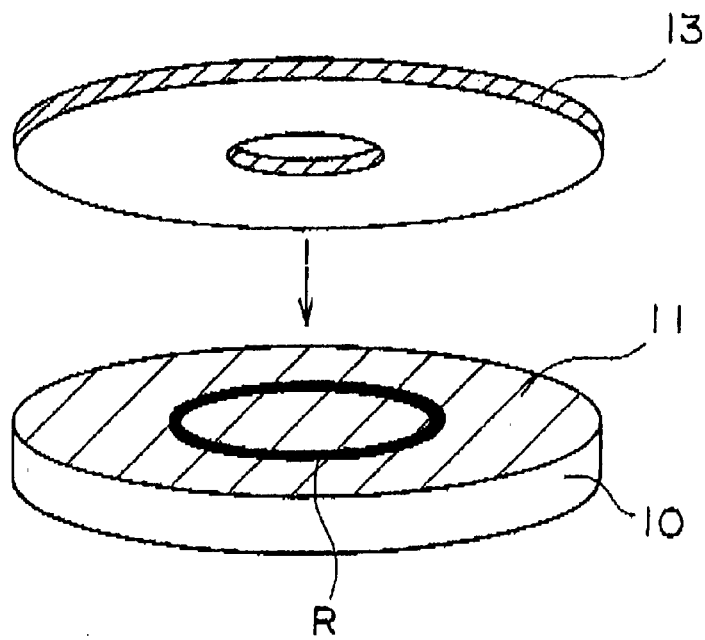

Next, as shown in FIG. 7B, a polymer sheet 13 comprised of a polycarbonate etc. produced by melt casting and punched out to a disk shape is superimposed on the optical recording layer 11 to which the adhesive agent R was supplied. In the case of a polymer sheet 13 comprised of a polycarbonate, the sheet is annealed in advance in accordance with need.

Figure 8A:
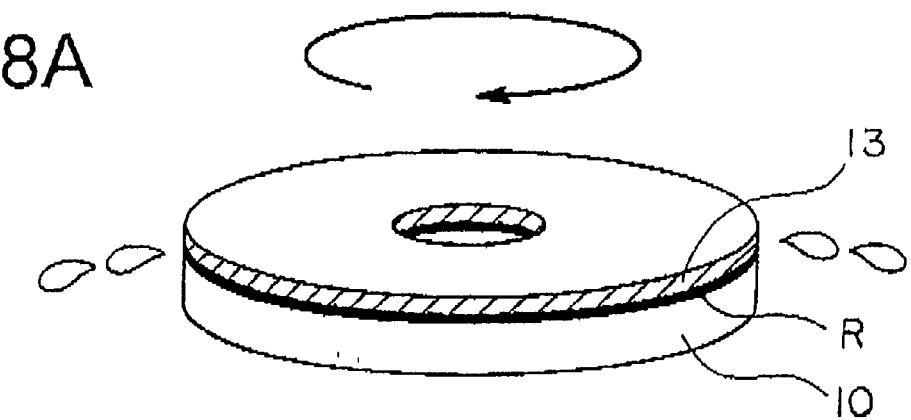

Next, as shown in FIG. 8A, the substrate 10 is spun at a high speed to make the adhesive agent R uniformly spread between the optical recording layer 11 and the polymer sheet 13 by centrifugal force and to shake off the excess adhesive agent.

Figure 8B:
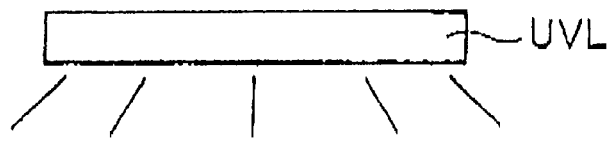
Figure 8B:
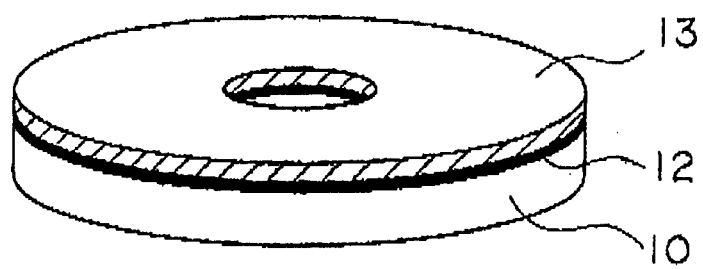

Next, as shown in FIG. 8B, ultraviolet light irradiation by an ultraviolet lamp UVL when the adhesive agent R is an ultraviolet curing resin, heating when it is a heat curing resin, or other curing is performed, whereby a cured adhesive layer 12 is obtained.

By the above steps, an optical disk having the configuration as shown in FIG. 3 can be produced.

According to the method of the producing an optical disk of the above embodiment, by making the adhesive layer in the protective layer thinner than that of the conventional optical disk, warping of the optical disk accompanying cure shrinkage of the adhesive layer or warping when the temperature or humidity changes can be suppressed. Further, a polymer sheet produced by melt casting can be improved in uniformity of thickness, so can improve the uniformity of thickness of the protective film comprised of the polymer sheet and the adhesive layer in production.

Second Embodiment

The configuration of the optical disk according to the present embodiment is similar to that of the optical disk according to the first embodiment. However, it is different in that a pressure-sensitive tackiness agent or other tackiness agent is used as the adhesive layer 12 for bonding the polymer sheet 13 to the optical recording layer 11. Since the Young's modules is low, warping of the disk is hard to occur even if the adhesive layer is made thick.

For example, when the thickness of the protective film is 100 $\mu$m, the thickness of the adhesive layer made by a tackiness agent is made 25 $\mu$m and the thickness of the polymer sheet is made 75 $\mu$m.

The method of producing an optical disk of the present embodiment will be explained with reference to drawings.

Figure 9A:
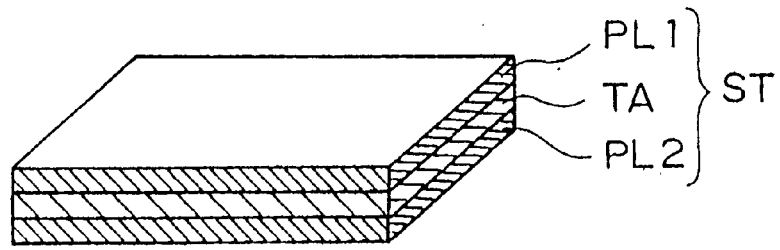

First, as shown in FIG. 9A, a stacked tackiness agent sheet ST comprised of a tackiness agent sheet TA sandwiched by two PET (polyethylene terephthalate) liners (PL1 and PL2) is prepared.

Figure 9B:
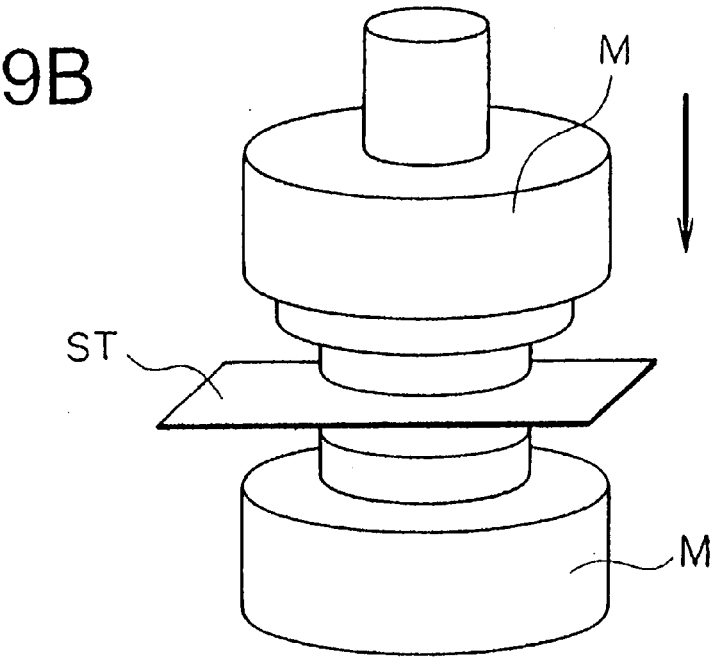

Next, as shown in FIG. 9B, the above stacked tackiness agent sheet ST is punched out to an optical disk size by a punching press M.

Figure 10A:
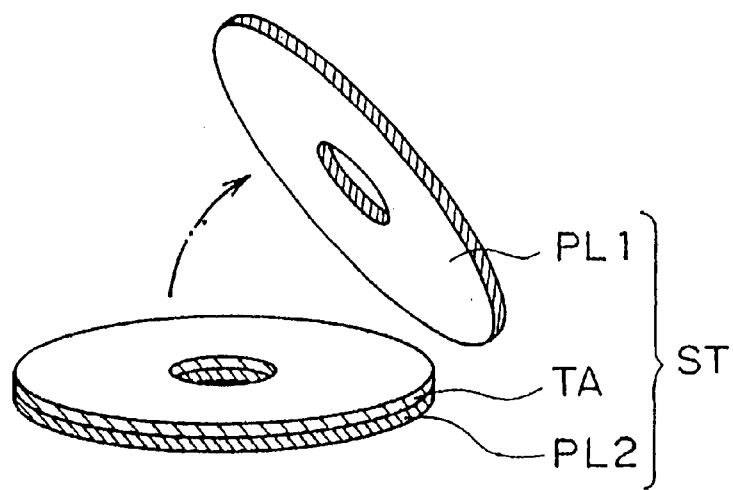

Next, as shown in FIG. 10A, the PET liner PL1 on one side of the above stacked tackiness agent sheet ST punched out to an optical disk size is peeled off.

Figure 10B:
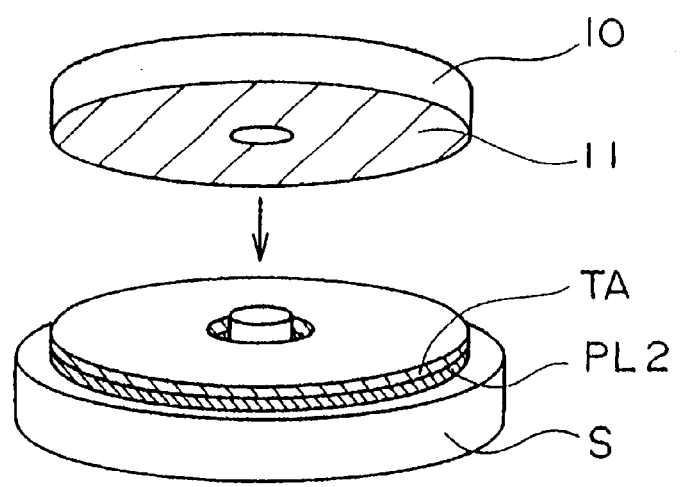

Next, as shown in FIG. 10B, the tackiness agent sheet TA formed as explained above and having the PET liner PL2 on one surface is set on a base S having a positioning protrusion at the center. A substrate 10 comprised of a polycarbonate etc. and formed with an optical recording layer 11 by a separate process in the same way as in the first embodiment is positioned and set on this so that the optical recording layer 11 side faces the tackiness agent sheet TA side.

Figure 11A:
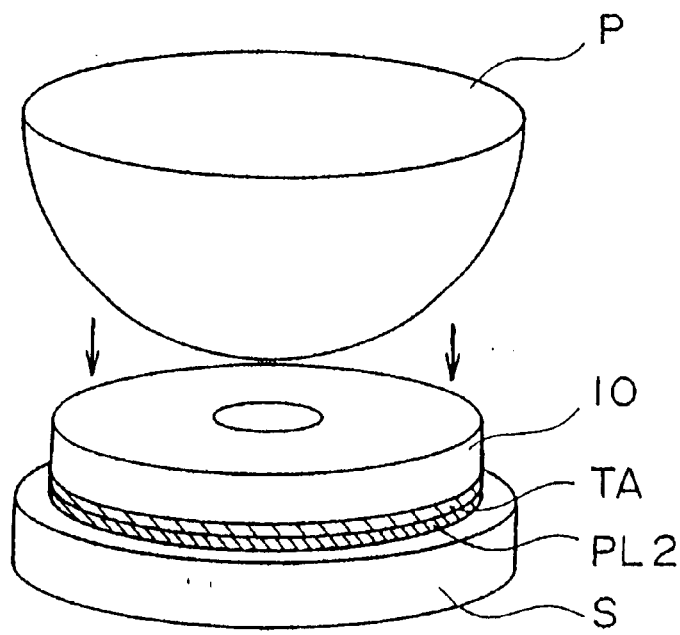

Next, as shown in FIG. 11A, the optical recording layer 11 and the tackiness agent sheet TA are sufficiently bonded by pressing them from above the substrate 10 by a pad P or a roller etc.

Figure 11B:
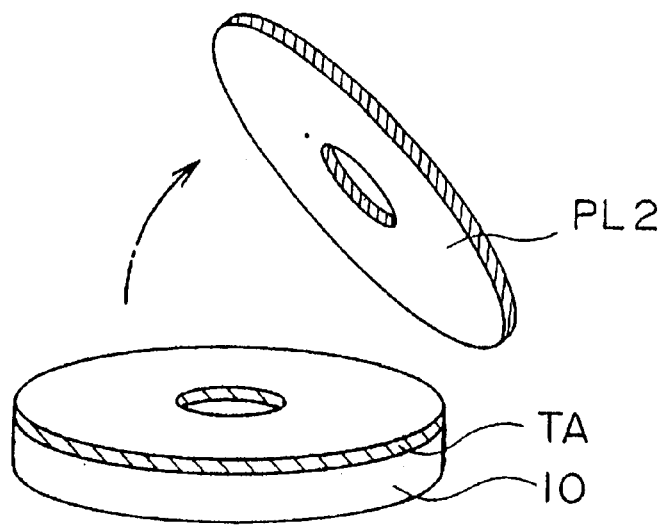

Next, as shown in FIG. 11B, the PET liner PL2 left on the other surface of the above tackiness agent sheet TA is peeled off.

Figure 12A:
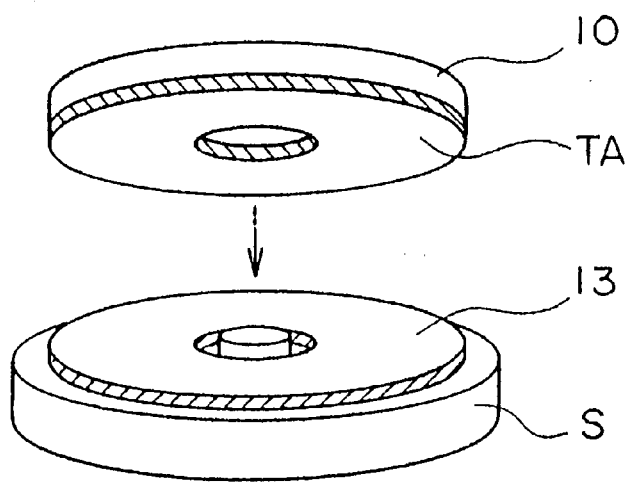

Next, as shown in FIG. 12A, a polymer sheet 13 formed in advance by a separate process is set on the base S having the positioning protrusion at the center. The substrate 10 to which tackiness agent sheet TA is bonded is positioned and set on this so that the tackiness agent sheet TA side faces the polymer sheet 13 side.

Figure 12B:
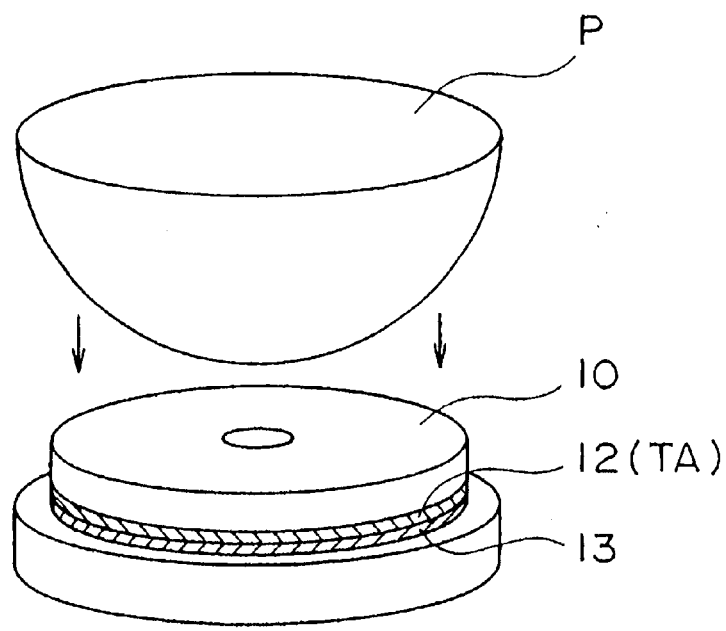

Next, as shown in FIG. 12B, the polymer sheet 13 and the tackiness agent sheet TA are sufficiently bonded by pressing them from above the substrate 10 by a pad P or a roller etc.

By the above steps, an optical disk having an adhesive layer 12 comprised of the tackiness agent TA in the configuration shown in FIG. 3 can be produced.

According to the method of producing the optical disk of the present embodiment, by making the adhesive layer in the protective film thinner than that of the conventional optical disk, warping of the optical disk accompanying cure shrinkage of the adhesive layer or warping when the temperature or humidity changes can be suppressed. Also, the polymer sheet produced by the melt casting can be improved in uniformity of thickness, so can improve the uniformity of thickness of the protective film comprised of the polymer sheet and the adhesive layer in production.

Third Embodiment

Figure 13:
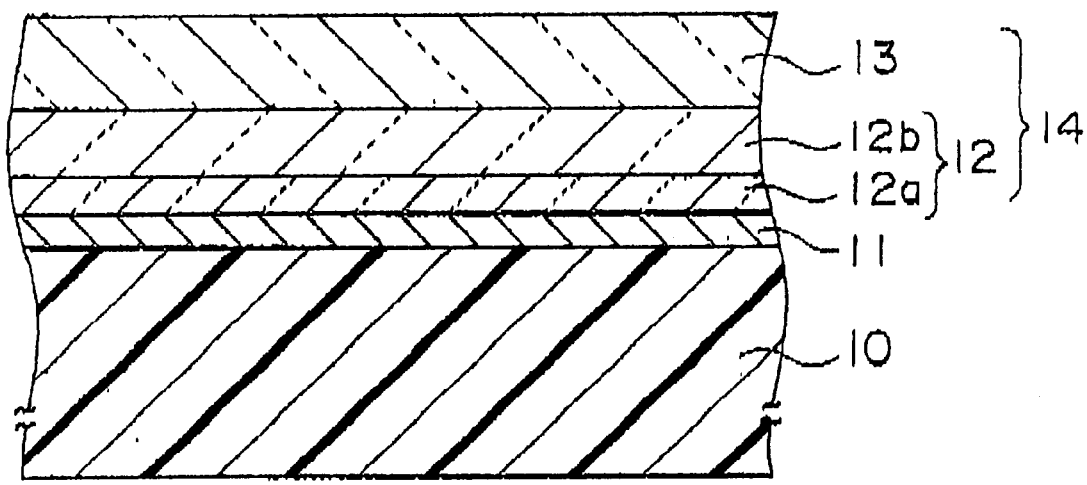
FIG. 13 is schematic sectional view of part of optical recording medium according to the third embodiment.

FIG. 13 is a schematic sectional view of a part of an optical disk of the preset embodiment.

The disk is substantially the same as the first embodiment, but is different in that the adhesive layer has a two-layer configuration. When prevention of warping of the optical disk or corroding of the optical recording layer by the adhesive layer and bond strength by the adhesive layer are hard to realize by a single adhesive agent, it is effective to use two or more types of adhesive layers.

Namely, a pattern of irregularities for the optical recording layer is formed by, for example, injection-molding on a cyclic polyolefin sheet (Zeonex Sheet, made by Nippon Zeon) or other substrate 10 having a thickness of at least 0.3 mm, for example, about 1.1 mm, and an aluminum or other optical recording layer 11 is formed on the substrate 10. A cyclic polyolefin sheet (Zeonex Sheet, made by Nippon Zeon) or other polymer sheet 13 produced by melt casting is stacked on and bonded to the optical recording layer 11 via the adhesive layer 12. By this, a light transmitting protective film 14 comprised of the adhesive layer 12 and the polymer sheet 13 and having a thickness of about 100 $\mu$m or so by the two layers together is configured.

The adhesive layer 12 for bonding the polymer sheet 13 to the optical recording layer 11 is comprised of a stack of a first adhesive layer 12a of an ultraviolet curing resin having low corrosiveness to the optical recording layer 11 etc. and a second adhesive layer 12b of a pressure-sensitive tackiness agent etc.

Since the optical recording layer 11 only contacts the first adhesive layer 12a having low corrosiveness, corrosion is prevented.

Also, with the above configuration, it is not necessary to consider bondability of the first adhesive layer 12a and the polymer sheet 13. This is particularly effective in the case of using a cyclic polyolefin sheet (Zeonex Sheet, made by Nippon Zeon) as the polymer sheet 13.

The optical disk of the present embodiment can be produced by forming the optical recording layer 11 on the substance 10, then thinly forming the first adhesive layer 12a by spin coating and curing it, then following the same procedure as in the first or second embodiment by the second adhesive layer.

As the optical disk as shown in FIG. 13, the configuration described below is also able to be configured. Namely, a pattern of irregularities for the optical recording layer is formed by, for example, injection-molding on a polycarbonate or other substrate 10 having a thickness of at least 0.3 mm, for example, about 1.1 mm, and an optical recording layer 11 made of organic based thin film or other is formed on the substrate 10. A polycarbonate or other polymer sheet 13 produced by melt casting is stacked on and bonded to the optical recording layer 11 via the adhesive layer 12. By this, a light transmitting protective film 14 comprised of the adhesive layer 12 and the polymer sheet 13 and having a thickness of about 100 μm by two layers together is configured. As above described configuration, when prevention of warping of the optical disk or diffusion of the optical recording layer to the adhesive layer or the bond strength by the adhesive layer are hard to realize by single adhesive agent, it is effective to use two or more types of adhesive layers.

The adhesive layer 12 for bonding the polymer sheet 13 to the optical recording layer 11 is comprised of a stack of a first adhesive layer 12a of an ultraviolet curing resin etc. capable of preventing diffusion of the optical recording layer 11 and a second adhesive layer 12b of a pressure-sensitive tackiness agent.

Since the optical recording layer 11 only contacts the first adhesive layer 12a capable of preventing diffusion, diffusion can be prevented.

Also, with the above configuration, it is not necessary to consider bondability of the first adhesive layer 12a and the polymer sheet 13.

The optical disk of the present embodiment can be produced by forming the optical recording layer 11 on the substrate 10, then thinly forming the first adhesive layer 12a by spin coating and curing it, then following the same procedure as in the first or second embodiment by the second adhesive layer.

EXAMPLE 1

A sample was prepared by forming a pattern of irregularities for a optical recording layer by injection-molding on a polycarbonate substrate having an outside diameter of 120 mm, inside diameter of 15 mm, and thickness of 1.1 mm, forming an optical recording layer of aluminum on the substrate and bonding a polycarbonate sheet having a thickness of 75 μm to the surface thereof by a tackiness agent having a thickness of 25 μm.

Here, the polycarbonate sheet is a sheet produced by melt casting. Four optical disk samples were made by using four types of sheets having different amounts of residual solvent (0.16 wt %, 0.27 wt %, 0.49 wt %, and 0.59 wt %).

The changes of radial skew of the above optical disk samples were measured after 30 days in an atmosphere of a temperature of 25° C. and a humidity of 50%.

For measuring the radial skew, at the state that the optical disk was hold at center portion thereof on the standard surface, a light which is perpendicular to the standard surface was irradiated on the surface of the disk end portion, and the reflection angle of obtained reflected light was measured, and thereby, the radial skew was measured as the slope of the surface of the disk end portion.

The results are shown in FIG. 14 and FIG. 15.

Figure 14A:
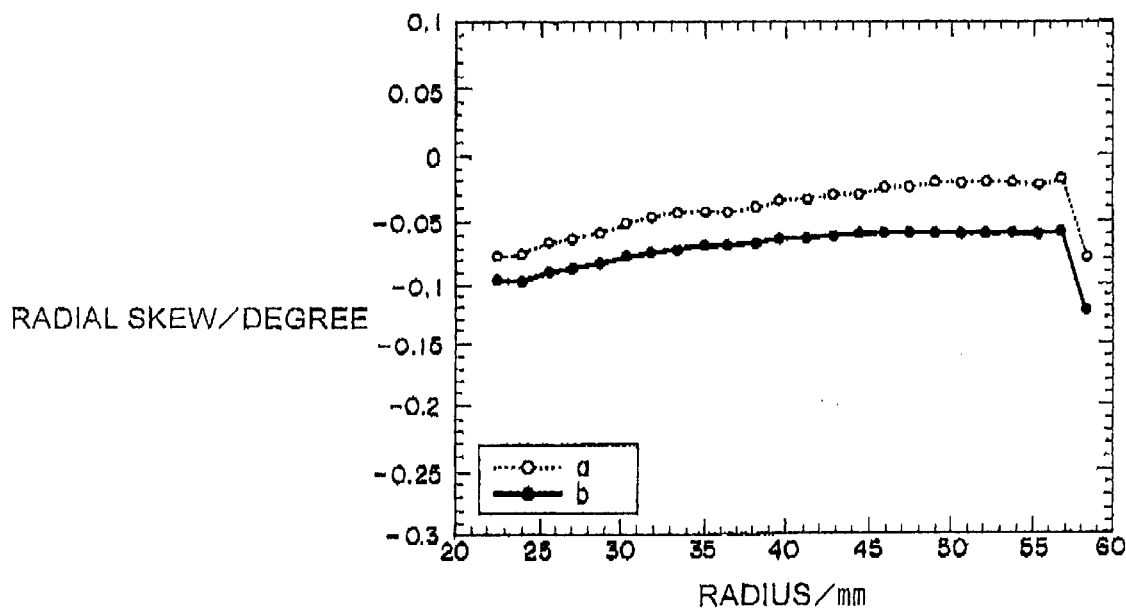
Figure 14B:
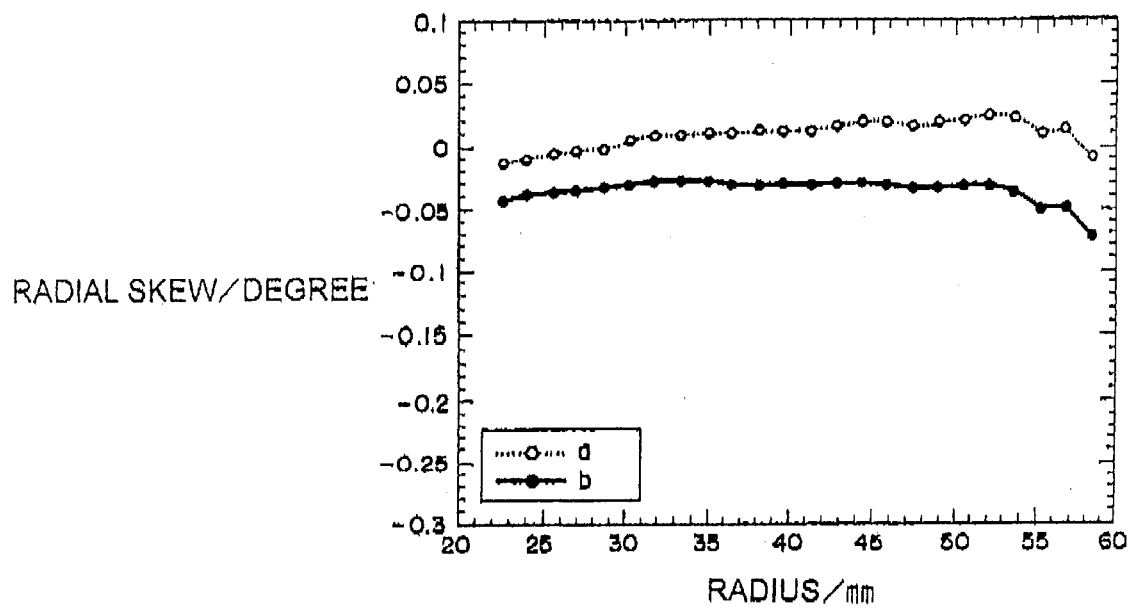
Figure 15A:
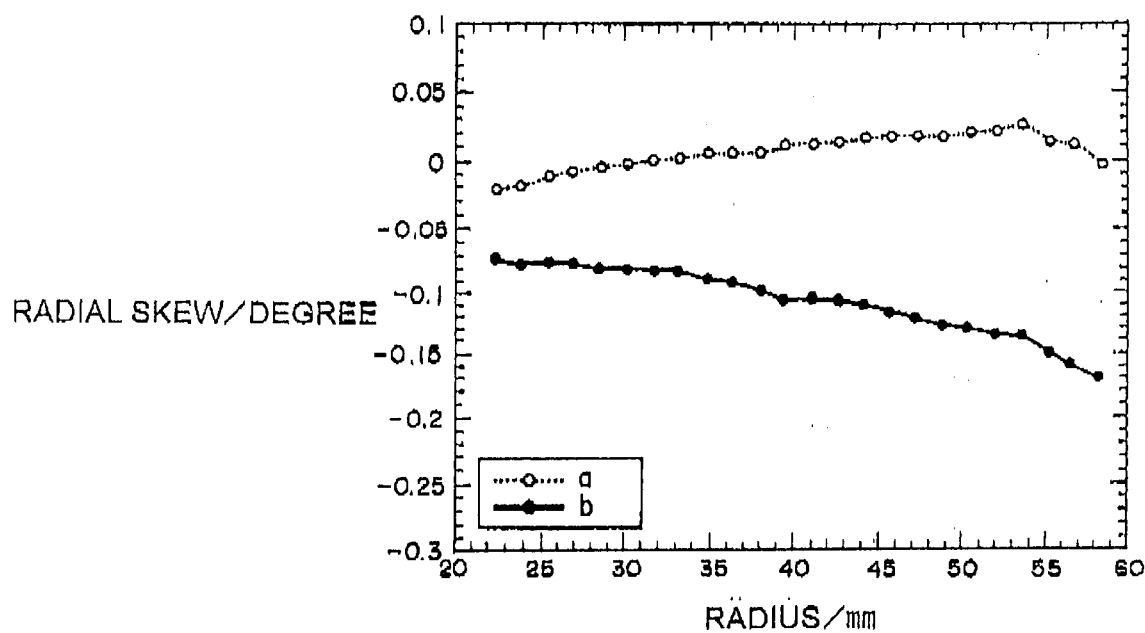
Figure 15B:
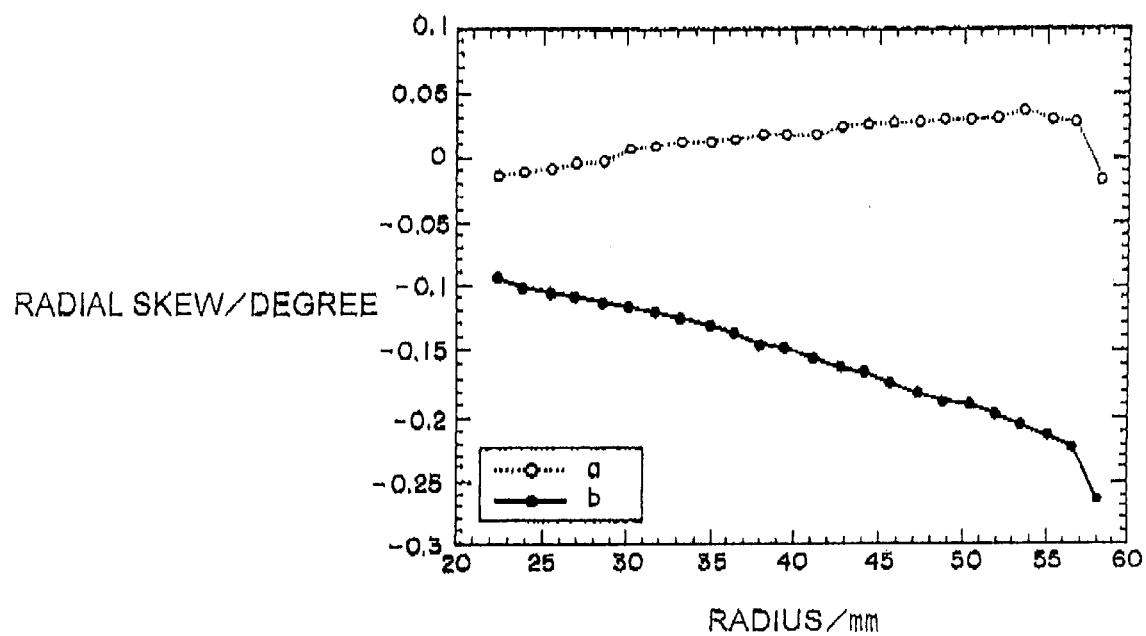

FIG. 14A is a graph wherein a value of the radial skew (degree) is plotted with respect to the radius (mm) for an optical disk sample having an amount of residual solvent of 0.16 wt %, while FIG. 14B is the same graph for 0.27 wt %, FIG. 15A for 0.49 wt %, and FIG. 15B for 0.59 wt %.

In the figures, the graph expressed by "a" is the state immediately after producing the optical disk sample, while the graph expressed by "b" is the state after the above 30 days.

It was found from the above results that when the amount of residual solvent is 0.49 wt % and 0.59 wt %, changes of the radial skew value are large before and after 30 days, but by making it not more than 0.3 wt % (0.16 wt % and 0.27 wt %), changes of the radial skew value can be suppressed to within 0.1 degree.

EXAMPLE 2

A sample was prepared by forming a pattern of irregularities for a optical recording layer by injection-molding on a polycarbonate substrate having an outside diameter of 120 mm, inside diameter of 15 mm, and thickness of 1.1 mm, forming an optical recording layer of a phase change film by sputtering on the substrate, supplying an ultraviolet curing resin (T-695/UR506-4, made by Nagase-Ciba) in a circle shape in a range of a radius of 15 to 30 mm on the surface, stacking thereon a polycarbonate sheet (C-1400 made by Teijin) having a thickness of 97 μm punched out to an outside diameter of 119 mm and an inside diameter of 36 mm, spinning this at 7000 rpm for 30 seconds to spread the ultraviolet curing resin between the polycarbonate substrate and the polycarbonate sheet and shake off excess resin, and irradiating ultraviolet light to cure the ultraviolet curing resin.

The thickness of the protective film (polycarbonate sheet and the adhesive layer) of the above optical disk sample was measured by a laser focus displacement meter (LT-8010, made by Keyence Corporation).

Figure 16A:
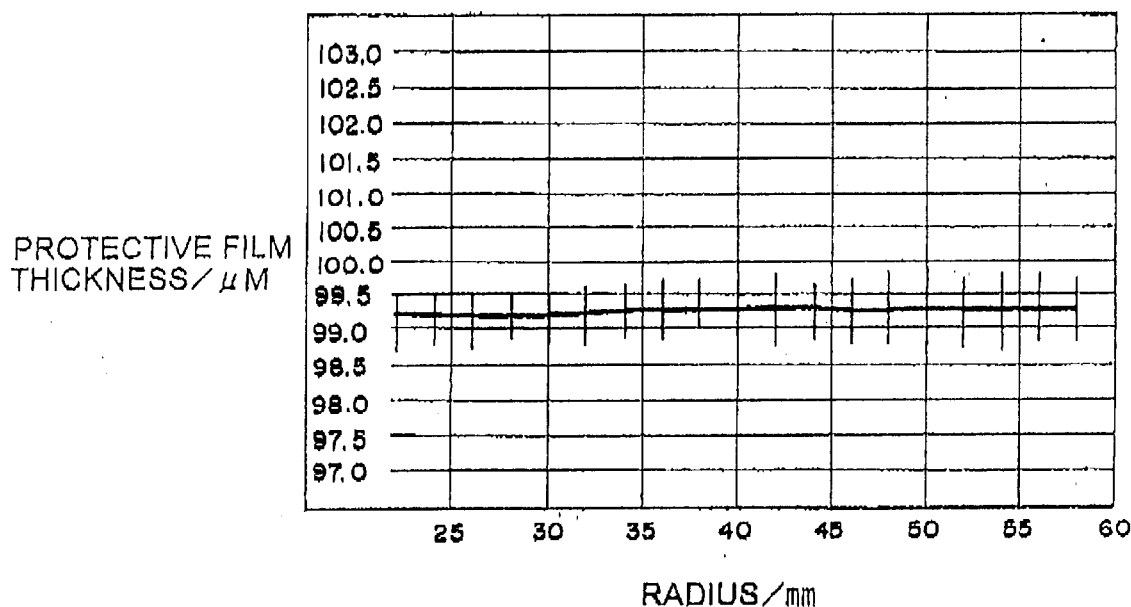
FIGS. 16A and 16B are graphs wherein protective thicknesses ($\mu$m) of optical disk samples according to Examples 2 and 3 are plotted with respect to a radius (mm)

FIG. 16A is a graph wherein the obtained protective thickness (μm) is plotted with respect to the diameter (mm).

The average thickness is 100.2 μm and the unevenness of thickness was ±1.0 μm.

EXAMPLE 3

A sample was prepared by forming a pattern of irregularities for a optical recording layer by injection-molding on a polycarbonate substrate having an outside diameter of 120 mm, inside diameter of 15 mm, and thickness of 1.1 mm, forming an optical recording layer of a phase change film by sputtering on the substrate, pressing by a rubber pad a tackiness agent sheet (DA-8310, made by Nitto Denko) having a thickness of 25 μm provided with a PET liner on the surface, peeling off the PET liner, then stacking a polycarbonate sheet (made by Teijin) having a thickness of 75 μm punched out to an outside diameter of 119 mm and inside diameter of 36 mm over the tackiness agent, and pressing again by the rubber pad.

In the same way as Example 2, the thickness of the protective film (polycarbonate sheet and adhesive layer (tackiness agent layer)) of the above optical disk sample was measured by a laser focus displacement meter.

Figure 16B:
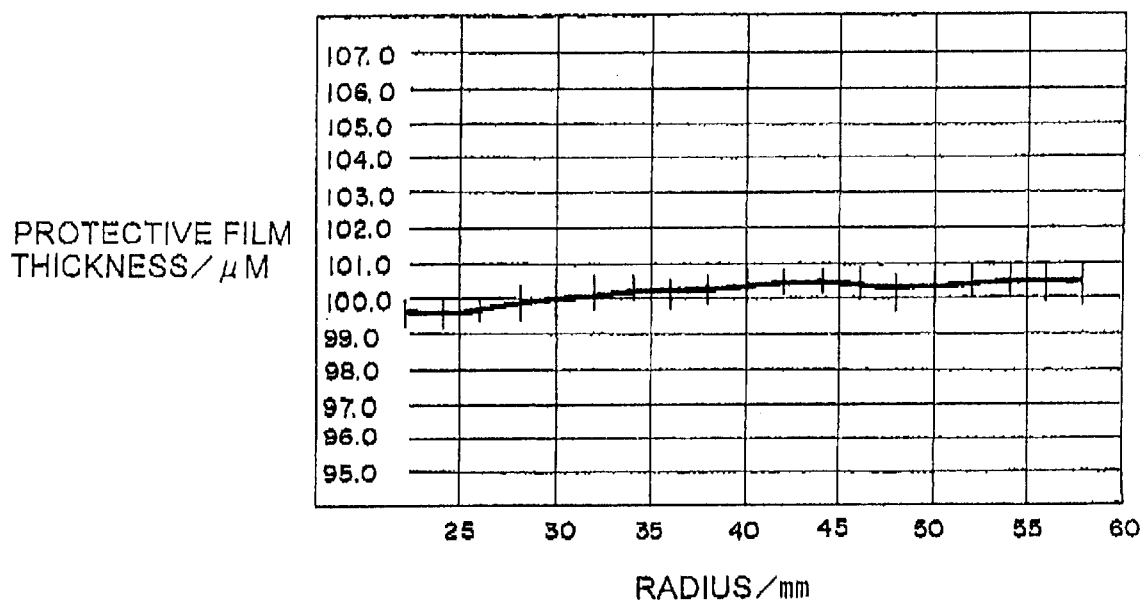

FIG. 16B is a graph wherein the obtained protective thickness (μm) is plotted with respect to the diameter (mm).

The average thickness was 99.3 μm and the unevenness of thickness was ±0.6 μm.

EXAMPLE 4

A sample having a protective film of a thickness of 113 μm comprising an adhesive layer comprised of a first adhesive layer (ultraviolet curing resin) and a second adhesive layer (tackiness agent) and a polymer sheet was prepared by forming a pattern of irregularities for a optical recording layer by injection-molding on a polycarbonate substrate having an outside diameter of 120 mm, inside diameter of 15 mm, and thickness of 1.1 mm, forming an optical recording layer of aluminum reflection film by sputtering on the substrate, supplying on the surface an ultraviolet curing resin (T-695/UR506-4, made by Nagase-Ciba), spin coating at 7000 rpm for 30 seconds, an irradiating ultraviolet light to cure the ultraviolet curing resin to form the first adhesive layer, then pressing by a rubber pad a tackiness agent sheet (DA-8310, made by Nitto Denko) having a thickness of 40 $\mu$m provided with a PET liner over the layer, peeling off the PET liner, then stacking over the layer a cyclic polyolefin sheet (Zeonex Film, made by Nippon Zeon) having a thickness of 70 $\mu$m punched out to an outside diameter of 119 mm and an inside diameter of 36 mm, and pressing again by the rubber pad.

The state of corrosion of the aluminum optical recording layer after an accelerated test leaving the above sample in an atmosphere of a temperature of 80° C. and a humidity of 85% for 96 hours and changes of radial skew before and after the accelerated test were measured.

At the same time, a sample having the same configuration as above but differing only in not having the first adhesive layer (ultraviolet curing resin) was prepared. The states of corrosion of the aluminum optical recording layers of the two after the accelerated test were observed under a microscope. As a result, corrosion of the aluminum was not observed in the sample having the two-layer configuration of the first adhesive layer (ultraviolet curing resin) and the second adhesive layer (tackiness agent), but corrosion of the aluminum was observed in the sample wherein the first adhesive layer (ultraviolet curing resin) was not formed.

Figure 17:
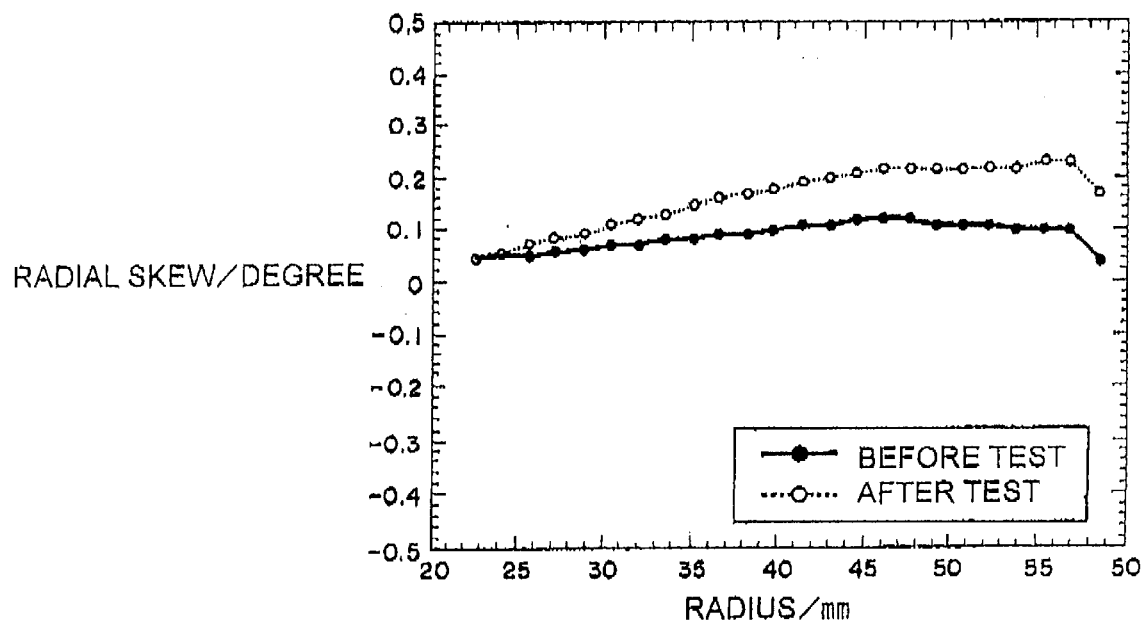
FIG. 17 is a graph wherein a value of a radial skew (degree) before and after an accelerated test of an optical disk sample according to Example 4 is plotted with respect to a radius (mm).

FIG. 17 is a graph wherein a value of the radial skew (degree) of a sample having the above two-layer configuration of the first adhesive layer (ultraviolet curing resin) and the second adhesive layer (tackiness agent) is plotted with respect to the radius (mm) and is a graph of results of measurement before and after the accelerated test.

From the above results, the radial skew value was 0.1 degree before the accelerated test and the change due to the accelerated test was 0.12 degree.

EXAMPLE 5

A sample having a protective film of a thickness of 113 $\mu$m comprising an adhesive layer comprised of a first adhesive layer (ultraviolet curing resin) and a second adhesive layer (tackiness agent) and a polymer sheet was prepared by forming a pattern of irregularities for a optical recording layer by injection-molding on a polycarbonate substrate having an outside diameter of 120 mm, inside diameter of 15 mm, and thickness of 1.1 mm, forming an optical recording layer of thin film of an organic pigment on the substrate, supplying on the surface an ultraviolet curing resin (T-695/UR506-4, made by Nagase-Ciba), spin coating at 7000 rpm for 30 seconds, an irradiating ultraviolet light to cure the ultraviolet curing resin to form the first adhesive layer preventing diffusion of the organic pigment, then pressing by a rubber pad a tackiness agent sheet (DA-8310, made by Nitto Denko) having a thickness of 40 m provided with a PET liner over the layer, peeling off the PET liner, then stacking over the tackiness agent a polycarbonate sheet (made by Teijin) having a thickness of 70 $\mu$m punched out to an outside diameter of 119 mm and an inside diameter of 36 mm, and pressing again by the rubber pad.

At the same time, a sample having the same configuration as above but differing only in not having the first adhesive layer (ultraviolet curing resin) was prepared. Accelerated tests were conducted exposing the two sample to an atmosphere of a temperature of 80° C. and a humidity of 85% for 96 hours and the suitability for recording on the optical recording layer after the accelerated test was investigated. Recording was possible in the sample having the two-layer configuration of the first adhesive layer (ultraviolet curing resin) and the second adhesive layer (tackiness agent), while recording was impossible in the sample wherein the first adhesive layer (ultraviolet curing resin) was not formed.

EXAMPLE 6

By using a birefringence measurement device (ADR-130N, made by Oak Co.), the birefringence in the in-plane direction of the polycarbonate sheet (C-1400, made by Teijin Limited) produced by the above melt casting and the difference of a refractive index in a direction perpendicular to the in-plane direction and an average of the refractive index in the in-plane direction were measured.

The amount of retardation of the birefringence in the in-plane direction was 12 nm, and the difference of the refractive index in a direction perpendicular to the in-plane direction and the average of the refractive index in the in-plane direction was 0.0010.

EXAMPLE 7

A polycarbonate sheet (thickness of 97 $\mu$m) including a residual solvent in an amount of 0.4 wt % was dried at 120° C. for one hour by hot air.

The same sample as in Example 1 was prepared by using the above polycarbonate sheet and the change of warping after three months in an atmosphere of a temperature of 25° C. and humidity of 50% was measured. The change was 0.08 degree.

EXAMPLE 8

The number of air bubbles or crystals in a polycarbonate sheet (thickness of 97 $\mu$m) produced by melt casting was investigated. As a result, the foreign matter was concentrated within a range of 20 $\mu$m from a belt surface side in the melt casting and the density was 30000/cm$^2$.

Also, the same sample as in Example 2 was prepared using the above polycarbonate sheet. However, a sample where the belt surface in the melt casting was made the optical disk surface and a sample where the belt surface in the melt casting was made the surface bonded to the ultraviolet curing resin were separately prepared.

The two types of samples were written on at a density equivalent to 22 GB and the error rates at the time of reproduction were measured. The error at the time of reproduction in the sample where the belt surface in the melt casting was made the optical disk surface was less than $\frac{1}{10}$ that in the sample where the belt surface in the melt casting was made the surface bonded to the ultraviolet curing resin.

The present invention is not limited to the above embodiments.

For example, the materials and thicknesses etc. of the substrate, the optical recording layer, and the adhesive layer between layers comprising the optical recording medium are not limited to those explained in the above embodiments and may be suitably selected.

Also, the polymer sheet may be any produced by melt casting. The material and the thickness can be suitably selected.

Other than the above, a variety of modifications may be made within a scope not changing the gist of the present invention.

According to the optical recording medium of the present invention, the light transmitting protective film above the optical recording layer includes a polymer sheet produced by melt casting and an adhesive layer for bonding the polymer sheet to the optical recording layer and can make the adhesive layer thinner than that of the conventional optical disk to reduce warping accompanying cure shrinkage of the adhesive layer and suppress warping when the temperature or humidity changes. Further, the polymer sheet produced by melt casting can be improved in uniformity of thickness and can reducing the birefringence, so can improve the uniformity of thickness of the protective film including the polymer sheet and reduce the birefringence.

Also, according to the method of producing the optical recording medium of the present invention, by making the adhesive layer in the protective film thinner than that of the conventional optical disk, warping of the optical disk accompanying cure shrinkage of the adhesive layer or warping when the temperature or humidity changes can be suppressed and the uniformity of thickness of the polymer sheet produced by melt casting can be improved, so the uniformity of thickness of the protective film comprised of the polymer sheet and the adhesive layer can be improved in the production.

Note that the present invention is not limited to the above embodiments and includes modifications within the scope of the claims.

What is claimed is:

1. An optical recording medium comprising:
   a substrate;
   an optical recording layer formed on said substrate; and
   a light transmitting protective film formed at an upper layer of said optical recording layer;
   wherein said protective film includes a polymer sheet produced by melt casting and an adhesive layer for bonding the polymer sheet to said optical recording layer; and
   wherein a residual solvent in said polymer sheet is not more than 0.3 wt %.

2. An optical recording medium as set forth in claim 1, wherein, a surface formed in contact with the cast when said polymer sheet is produced by melt casting is arranged to be at afar side from said optical recording layer.

3. An optical recording medium as set forth in claim 1, wherein a birefringence in the in-plane direction of paid polymer sheet is not more than 15 nm.

4. An optical recording medium as set forth in claim 1, wherein a difference of an average value of a refractive index in an in-plane direction of said polymer sheet and a refractive index in a direction perpendicular to the in-plane direction is not more than 0.0015.

5. An optical recording medium as set forth in claim 1, wherein said polymer sheet comprises a polycarbonate.

6. An optical recording medium comprising:
   a substrate;
   an optical recording layer formed on said substrate; and
   a light transmitting protective film formed at an upper layer of said optical recording layer;
   wherein said protective film includes a polymer sheet produced by melt casting and an adhesive layer for bonding the polymer sheet to said optical recording lever; and
   wherein said adhesive layer comprises a stack of a ultraviolet curing resin-based adhesive agent layer and a pressure-sensitive tackiness agent layer.

* * * * *